(12) United States Patent
Fanshier et al.

(10) Patent No.: US 11,805,719 B2
(45) Date of Patent: *Nov. 7, 2023

(54) AGRICULTURAL MACHINE HAVING TIRES OF DIFFERENT DIAMETERS, AND RELATED METHODS

(71) Applicant: AGCO Corporation, Duluth, GA (US)

(72) Inventors: Benjamin Anson Fanshier, Hesston, KS (US); Monte J. Rans, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 380 days.

This patent is subject to a terminal disclaimer.

(21) Appl. No.: 17/104,769

(22) Filed: Nov. 25, 2020

(65) Prior Publication Data

US 2021/0076556 A1    Mar. 18, 2021

Related U.S. Application Data

(63) Continuation of application No. 16/050,792, filed on Jul. 31, 2018, now Pat. No. 10,881,044.

(60) Provisional application No. 62/543,832, filed on Aug. 10, 2017.

(51) Int. Cl.
   *A01B 63/16*     (2006.01)
(52) U.S. Cl.
   CPC ................................. *A01B 63/16* (2013.01)

(58) Field of Classification Search
   CPC .......... A01B 63/16; A01B 63/14; A01B 63/00
   See application file for complete search history.

(56) References Cited

U.S. PATENT DOCUMENTS

| | | | | |
|---|---|---|---|---|
| 4,624,196 A | * | 11/1986 | Anderson | A01C 7/06 111/926 |
| 5,499,685 A | * | 3/1996 | Downing, Jr. | A01C 5/062 111/140 |
| 5,680,715 A | * | 10/1997 | Thiboutot | E01H 4/02 37/219 |
| 2008/0196947 A1 | * | 8/2008 | Brazier | B60G 21/045 180/9.5 |
| 2012/0018984 A1 | * | 1/2012 | Oriet | B60K 17/36 475/331 |

FOREIGN PATENT DOCUMENTS

| | | | | |
|---|---|---|---|---|
| CA | 1288499 C | * | 9/1991 | ............. B60C 23/10 |
| JP | 2008174165 A | * | 7/2008 | ............. B60C 23/10 |

* cited by examiner

*Primary Examiner* — Christopher J. Novosad

(57) ABSTRACT

An agricultural machine includes a frame having a tongue hitch for attachment to a towing vehicle, the tongue hitch being oriented along a longitudinal axis inline with the direction of travel. The agricultural machine has an axle mounted to the frame and an arm mounted to the axle. A front spindle is mounted at the front end of the arm with a front tire mounted to the front spindle and a rear spindle is mounted at the rear end of the arm with a rear tire mounted to the rear spindle. The tires are positioned on a same side of the swing arm. The front tire has a different diameter than a diameter of the rear tire.

20 Claims, 4 Drawing Sheets

AGRICULTURAL MACHINE HAVING TIRES OF DIFFERENT DIAMETERS, AND RELATED METHODS

CROSS REFERENCE TO RELATED APPLICATIONS

This application is a continuation of U.S. patent application Ser. No. 16/050,792, "Planter with Full Tandem Offset Pivot," filed Jul. 31, 2018, which claims the benefit of U.S. Provisional Application No. 62/543,832, filed Aug. 10, 2017, the entire disclosures of each of which are hereby incorporated by reference in their entireties.

FIELD

This invention relates generally to agricultural machines, and more particularly to an agricultural machine such as a planter having inline tandem wheels that have differing sizes/capacity with an offset pivot.

BACKGROUND

Agricultural machines such as planters with a plurality of row units are used to plant seeds upon or in the ground. The agricultural machine is carried by running gear that have one or more tires that support that the weight of the machine in the field. To increase efficiency, planters are becoming wider and the seed hoppers that feed the row units are becoming larger. Therefore, the running gear must be designed to support these larger weights while minimizing the impact on the field of soil compaction from the weight.

Typical ways of supporting a planter includes using a long tandem running gear. A typical long tandem has a main pivot centered between the tires. Having the main pivot further forward creates an upward hitch weight, limiting hitch options and creating unstable situations. Also, having a main pivot centered between the tires puts the main action of the tire further away from the seeding row units, thereby hurting planter functionality.

Another option is to use a double-sided tandem with the forward and rear tires on differing sides of the running gear. With a double-sided tandem, the pivot is further back, but this requires the tires to be on opposite sides of the running gear. The weight of the machine is transferred from the tires to the soil and creates a zone in the soil between the tires that experiences a pinch point, effectively doubling the pressure in those areas. Also, the tires, though separate, remain close together and have deep soil compaction issues. The double-sided tandem can also limit space for narrow row spacing (rows less than 30 inches apart), thereby hurting functionality.

Another option is to use running gear with a large single tire. These large singles take up a valuable space often needed by other planter functions. The large singles also potentially cause deep soil compaction.

It is desirable to have running gear for the agricultural machine that supports the increase of product weight that planters are being required to carry, while minimizing the impact of this weight in the field. It is further desired to maintain implement maneuverability and overall planter functionality.

BRIEF SUMMARY

In one embodiment, the invention is directed to an agricultural machine configured to travel through a field in a direction of travel. The agricultural machine includes a frame having a tongue hitch for attachment to a towing vehicle, the tongue hitch being oriented along a longitudinal axis L which is generally in line with the direction of travel. The agricultural machine has at least one set of running gear configured to support the frame for movement through the field. Each set of running gear includes an axle mounted to the frame and a swing arm pivotably mounted to the axle defining a main pivot axis. The swing arm has a front end and a rear end relative the longitudinal axis with the main pivot axis in a portion located between the front end and the rear end. A front spindle is mounted at the front end of the swing arm with a front tire mounted to the front spindle and a rear spindle is mounted at the rear end of the swing arm with a rear tire mounted to the rear spindle. The front tire and the rear tire are positioned on a same side of the swing arm with the rear tire longitudinally behind the front tire such that they are in line with each other so as to form an inline tandem running gear. The front tire has a smaller diameter than a diameter of the rear tire.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
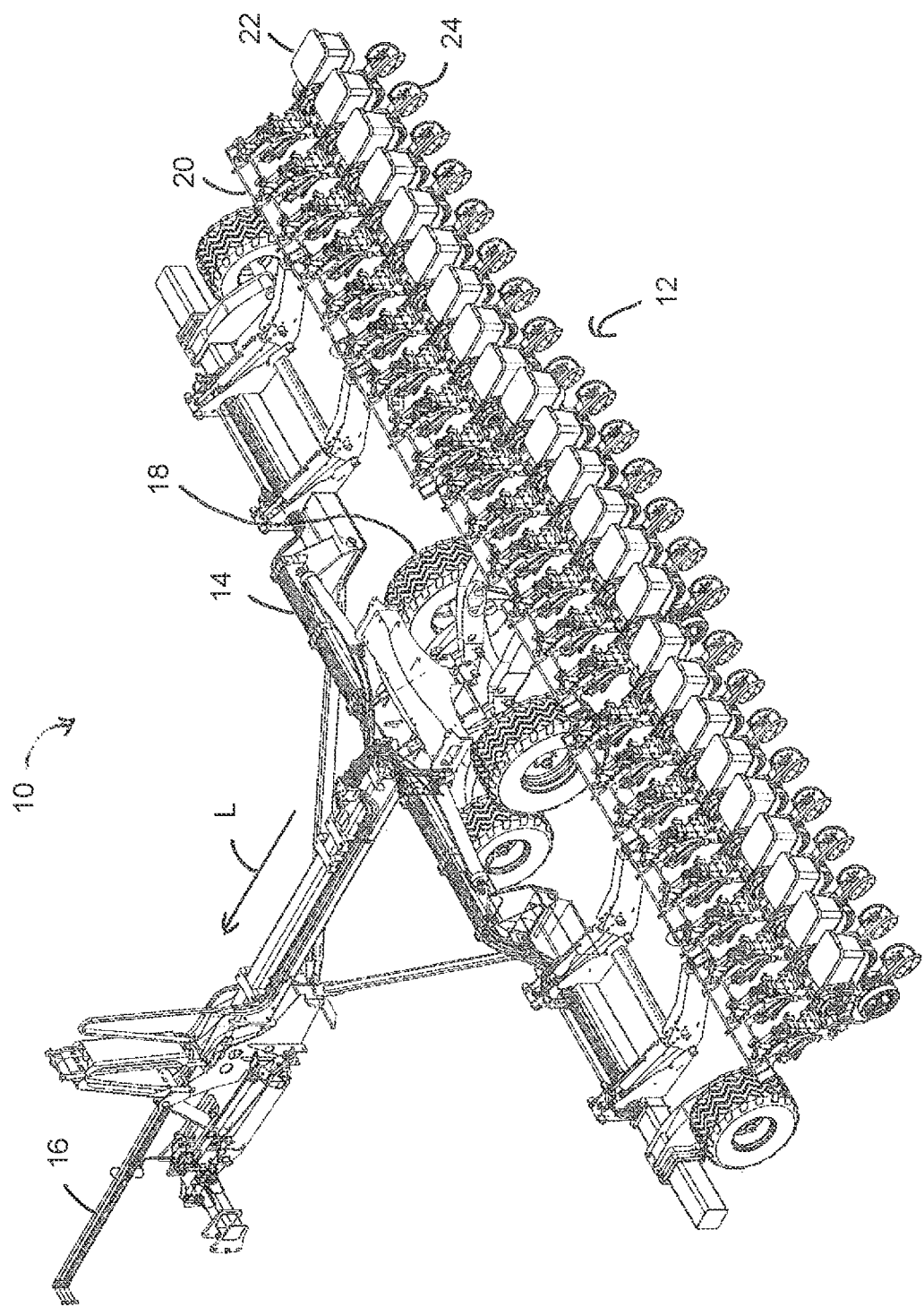
FIG. 1 is a perspective view of an agricultural machine in accordance with the principles of the present invention.

Referring to FIG. 1, an agricultural machine may include a wheeled cart 12, which includes a frame 14 and a tongue hitch 16 for attachment to a tractor or towing means (not shown). In the illustrated embodiment, the agricultural machine 10 is a planter 10 for planting row crop seeds. The frame 14 is supported for movement over the ground with running gear 18, with the running gear 18 including two wheels that are arranged in a tandem configuration as explained below. The tongue hitch 16 is oriented along a longitudinal axis L which is generally in line with the direction of travel. The agricultural machine 10 may further include a tool arm 20 to which is mounted seed delivering elements such as seed hoppers 22 and row units 24 with seed metering discs of conventional design. Although the agricultural machine 10 in the shown embodiments is a planter, any type of agricultural machine may utilize the running gear with tandem wheel configuration as described herein.

Figure 2:
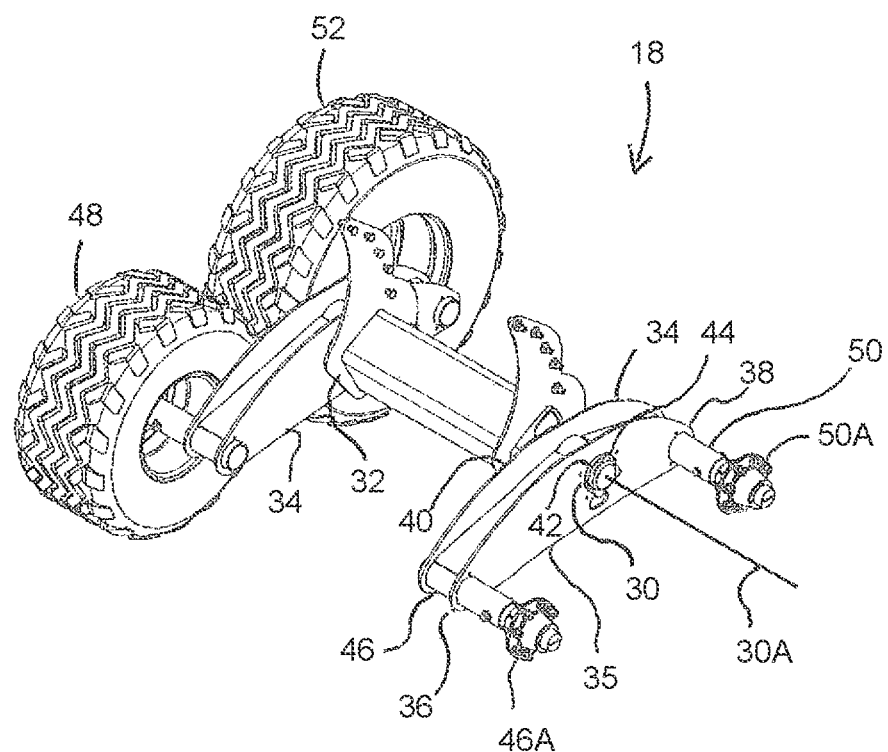
FIG. 2 is an enlarged perspective view of a running gear portion of the agricultural machine of FIG. 1.
Figure 3:
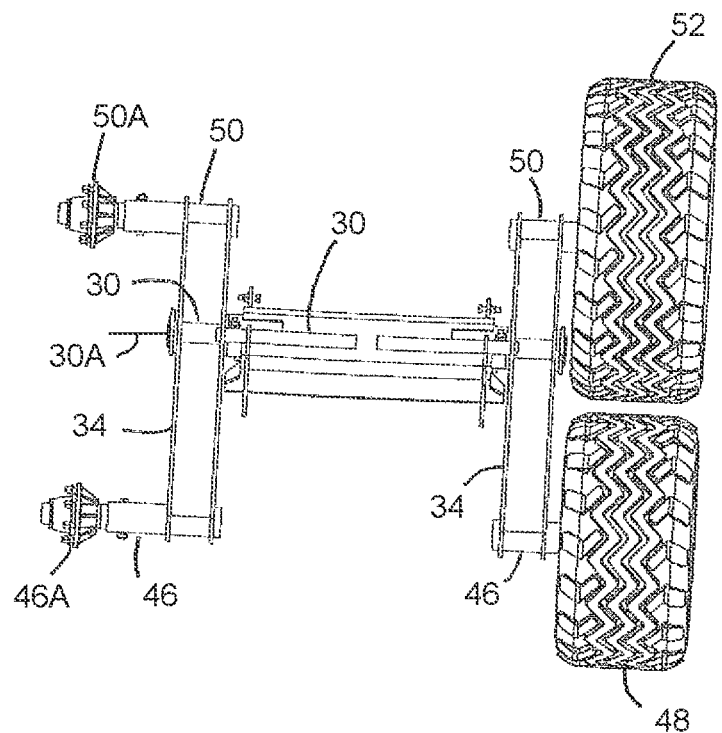
FIG. 3 is a side elevation view of the running gear of FIG. 2.

Turning now to FIGS. 2 and 3, each running gear 18 includes an axle 30 mounted to the frame 14 at hub 32. A swing arm 34 is pivotably mounted to the axle 30 defining a main pivot axis 30A. In the illustrated embodiment, the swing arm 34 is an elongate body 35 having a front end 36 and a rear end 38 with the main pivot axis 30A in a top portion 40 located between the front end 36 and the rear end 38. A hole 42 is provided in the top portion 40 of the body 35 for mounting onto the axle 30 with a suitable bearing 44 to allow the swing arm 34 to pivot about the axle 30 to which the swing arm 34 is mounted.

Figure 4:
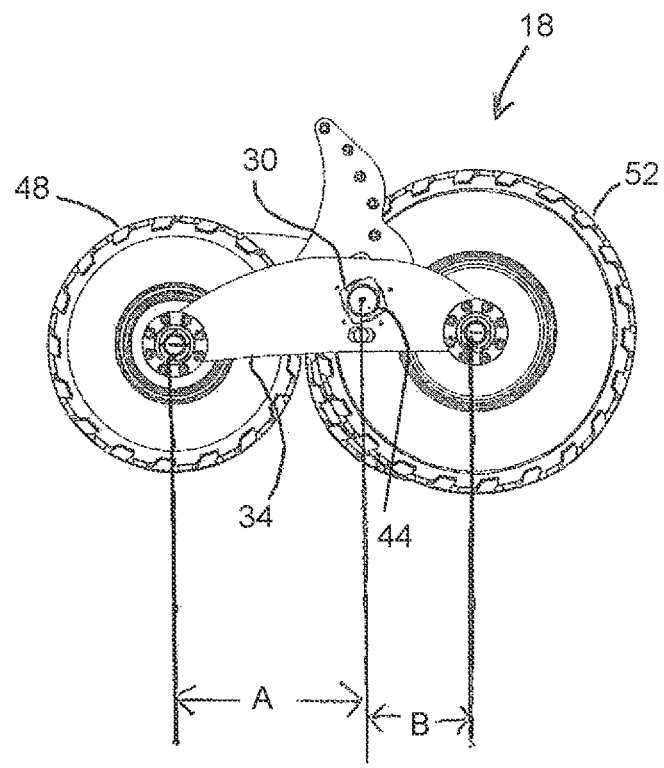
FIG. 4 is a top view of the running gear of FIG. 2.

A front axle 46 having a front spindle 46A is provided at the front end 36 of the body 35 of the swing arm 34. A front tire 48 is mounted to the front spindle 46A. A rear axle 50 having a rear spindle 50A is provided at the rear end 38 of the body 35 of the swing arm 34. A rear tire 52 is mounted to the rear spindle 50A. As best seen in FIG. 4, the front tire 48 and the rear tire 52 are on the same side of the body 35 of the swing arm 34 with the rear tire 52 longitudinally behind the front tire 48 such that they are in line with each other so as to form an inline tandem running gear 18. It has been found that soil pinching is reduced due to the tires 48, 52 being on the same side of the swing arm 34 in an inline formation. Desirably, the air pressure of each tire 48, 52 is maintained substantially the same.

According to the invention, the front tire 48 has a smaller diameter than a diameter of the rear tire 52. As best seen in FIG. 4, the swing arm 34 is configured such that a longitudinal distance A between the main pivot axis 30A and the front axle 46 is greater than a distance B between the main pivot axis 30A and the rear axle 50, such that the tires 48, 52 are offset from the main pivot axis 30A. As would be understood by one skilled in the art, since the rear tire 52 has a larger diameter than the front tire 48, the rear tire 52 will also have a larger contact surface area or footprint with the ground than that of the front tire 48. Desirably, the differing sizes in tires 48, 52 is such that the resultant vertical load on the ground from the rear tire 52 is about 125-175% of the vertical load of the front tire 48. With the air pressures in the front and rear tires 48, 52 being substantially the same, the variation of the vertical load allows the front and rear tires 48, 52 to have substantially equal ground pressure values. The longitudinal distance A between the main pivot axis 30A and the front axle 46 is desirably about 125-175% of the distance B between the main pivot axis 30A and the rear axle 50, and more desirably, about 150% of the distance. The larger rear tire 52 provides advantages in rolling over and/or through obstacles due to its larger size. Also, the front tire 48 is smaller due to limited space on the agricultural machine 10. Offsetting the main pivot axis 30A by using a front tire 48 and rear tire 52 having different tire sizes and maintaining constant flotation between these two tires, allows for the main weight (i.e., the center of gravity) of the agricultural machine 10 to be in front of the main pivot axis 30A, thereby keeping downward weight on the hitch of the towing tractor.

An agricultural machine 10 with the tandem running gear 18 mounted to each of its axles 30 is better equipped to reduce deep soil compaction and provide improved stability during travel of the agricultural machine 10. The swing arm 34 with tandem tires 48, 52 requires less space than a single larger tire and brings the main action of the tire closer to the seeding row. As the swing arm 34 may pivot about the axle 30 on which it is mounted, at least one of the front tire 48 and the rear tire 52 mounted on the swing arm 34 may remain in contact with the ground during travel over and/or through obstacles, thereby improving the travel of the agricultural machine over and through obstacles.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention is obtained by referring to the detailed description of the exemplary embodiments taken in conjunction with the accompanying drawings.

The invention claimed is:

1. An agricultural machine comprising:
   a frame defining a longitudinal axis and having a tongue hitch configured for attachment to a towing vehicle;
   an axle mounted to the frame;
   an arm having a front end and a rear end relative to the longitudinal axis of the frame and a first side generally parallel to the longitudinal axis, wherein the arm is mounted to the axle between the front end and the rear end;
   a front spindle mounted to the first side of the front end of the arm;
   a rear spindle mounted to the first side of the rear end of the arm;
   a front tire having a first diameter mounted to the front spindle; and
   a rear tire having a second diameter mounted to the rear spindle, wherein the second diameter is different from the first diameter.

2. The agricultural machine of claim 1, wherein the agricultural machine comprises a planter.

3. The agricultural machine of claim 1, further comprising a bearing, wherein the arm is mounted to the axle with the bearing such that the arm can pivot about the axle.

4. The agricultural machine of claim 1, wherein the arm is configured such that a longitudinal distance A between the axle and the front spindle is greater than a longitudinal distance B between the axle and the rear spindle.

5. The agricultural machine of claim 4, wherein the longitudinal distance A between the axle and the front spindle is between 125% and 175% of the distance B between the axle and the rear spindle.

6. The agricultural machine of claim 1, wherein an axis of rotation of the front tire longitudinally leads the axle and an axis of rotation of the rear tire longitudinally trails the axle.

7. The agricultural machine of claim 1, wherein the front tire and the rear tire are pressurized to a common air pressure.

8. The agricultural machine of claim 1, wherein a center of gravity of the agricultural machine longitudinally leads the axle.

9. The agricultural machine of claim 1, wherein the rear tire longitudinally trails the front tire.

10. The agricultural machine of claim 1, wherein the second diameter is larger than the first diameter.

11. The agricultural machine of claim 1, wherein vertical load on the ground from the rear tire is about 125-175% of a vertical load on the ground from the front tire.

12. The agricultural machine of claim 1, wherein the frame carries a tool arm, and wherein a plurality of row units are mounted to tool arm.

13. The agricultural machine of claim 12, wherein each row unit of the plurality comprises at least one seed metering disc.

14. The agricultural machine of claim 1, further comprising at least one seed hopper carried by the frame.

15. The agricultural machine of claim 1, wherein the axle is mounted perpendicular to the longitudinal axis.

16. A method of working an agricultural field, the method comprising:

towing a vehicle through the agricultural field, the vehicle comprising:
- a frame having a longitudinal axis;
- an axle mounted to the frame;
- an arm having a front end and a rear end relative to the longitudinal axis of the frame and a first side generally parallel to the longitudinal axis, wherein the arm is mounted to the axle between the front end and the rear end;
- a front spindle mounted to the first side of the front end of the arm;
- a rear spindle mounted to the first side of the rear end of the arm;
- a front tire having a first diameter mounted to the front spindle; and
- a rear tire having a second diameter mounted to the rear spindle, wherein the second diameter is different from the first diameter;

maintaining an air pressure in the front tire to be substantially equal to an air pressure in the rear tire.

17. The method of claim 16, further comprising maintaining a center of gravity of the vehicle longitudinally leading the axle.

18. The method of claim 16, further comprising maintaining at least one of the front tire or the rear tire in ground contact as the vehicle is towed over obstacles in the agricultural field.

19. The method of claim 16, further comprising pivoting the arm relative to the axle.

20. The method of claim 16, wherein towing a vehicle through the agricultural field comprises pulling the vehicle through the agricultural field with a tractor.

* * * * *